(12) United States Patent
Hu et al.

(10) Patent No.: US 11,470,684 B2
(45) Date of Patent: Oct. 11, 2022

(54) METHOD FOR BUILDING SELF-ORGANIZED NETWORK, AND SELF-ORGANIZED NETWORK AND NODE DEVICE THEREOF

(71) Applicant: National Central University, Taoyuan (TW)

(72) Inventors: Chih-Lin Hu, Taoyuan (TW); Chitrin Bamrung, Taoyuan (TW); Ying-Jiun Lu, Taoyuan (TW); Wu-Min Sung, Taoyuan (TW); Jian-Chiuan Hou, Taoyuan (TW)

(73) Assignee: National Central University, Taoyuan (TW)

( * ) Notice: Subject to any disclaimer, the term of this patent is extended or adjusted under 35 U.S.C. 154(b) by 106 days.

(21) Appl. No.: 17/074,992

(22) Filed: Oct. 20, 2020

(65) Prior Publication Data
US 2022/0104310 A1  Mar. 31, 2022

(30) Foreign Application Priority Data

Sep. 28, 2020 (TW) .................................. 109133622

(51) Int. Cl.
| | |
|---|---|
| *H04W 84/18* | (2009.01) |
| *H04W 56/00* | (2009.01) |
| *H04L 67/104* | (2022.01) |
| *H04W 76/30* | (2018.01) |
| *G16Y 40/35* | (2020.01) |
| *H04L 67/1061* | (2022.01) |
| *G16Y 30/00* | (2020.01) |

(52) U.S. Cl.
CPC ............. *H04W 84/18* (2013.01); *G16Y 30/00* (2020.01); *G16Y 40/35* (2020.01); *H04L 67/1044* (2013.01); *H04L 67/1061* (2013.01); *H04W 56/0025* (2013.01); *H04W 76/30* (2018.02)

(58) Field of Classification Search
CPC . H04W 84/18; H04W 76/30; H04W 56/0025; G16Y 30/00; G16Y 40/35; H04L 67/1044; H04L 67/1061
See application file for complete search history.

(56) References Cited

U.S. PATENT DOCUMENTS

| | | | |
|---|---|---|---|
| 10,771,379 B2 * | 9/2020 | Thomas | ................ H04L 45/122 |
| 2009/0059815 A1 | 3/2009 | Cheng | |
| 2016/0098923 A1 * | 4/2016 | Patkar | .................... G08C 23/04 |
| | | | 398/106 |
| 2019/0182119 A1 * | 6/2019 | Ratkovic | ............... H04L 41/145 |

FOREIGN PATENT DOCUMENTS

CN          110958629 A      4/2020

* cited by examiner

*Primary Examiner* — Zhensheng Zhang
(74) *Attorney, Agent, or Firm* — Demian K. Jackson; Jackson IPG PLLC

(57) ABSTRACT

The present invention relates to a method for building self-organized network. The method including steps of providing a plurality of network nodes and configuring a layer of middleware into the each of the plurality of network nodes; implementing a hop-by-hop transport test to acquire a current status of message exchange among the plurality of network nodes; computing a nodal topology for the plurality of network nodes in accordance with the current status; establishing at least one peer-to-peer communication link among the plurality of network nodes in accordance with the nodal topology; and transmitting messages through the at least one peer-to-peer communication link.

6 Claims, 6 Drawing Sheets

METHOD FOR BUILDING SELF-ORGANIZED NETWORK, AND SELF-ORGANIZED NETWORK AND NODE DEVICE THEREOF

CROSS-REFERENCE TO RELATED APPLICATION

This application claims priority benefit to Taiwan Invention Patent Application Serial No. 109133622, filed on Sep. 28, 2020, in Taiwan Intellectual Property Office, the entire disclosures of which are incorporated by reference herein.

FIELD

The present invention relates to a self-organized network, in particular to a corresponding method for building a self-organized network principally based on a peer-to-peer communication link and a hop-by-hop transport technique.

BACKGROUND

In conventional technology, among wireless networked devices installed indoors or outdoors, some of these networked devices are installed in fixed locations and some are free to move; for example, in indoor environment, a Wi-Fi streaming monitor for home is usually fixedly installed in a certain position and not moved arbitrarily; a wireless base station or intelligent wireless gateway for home is not locked in a specific location and also not often moved arbitrarily.

However, other wireless networked devices, such as: laptops, tablet devices, internet of things (IoT) medical sensors or networked motion sensors, are likely moved arbitrarily with the user, and in most of the time these networked devices generally appear in a certain range and are usually connected to a wireless network access point (AP) to form a wireless local area network (WLAN), and then accessed to internet through the wireless AP.

With the conventional network configuration, wireless networked devices are deployed and structured in the space with the AP as the center point, and the transmission performance and stability of the wireless local area network may be directly affected by the deployment positions of the networked devices, obstacles (such as floor or wall) blocking transmission paths, and the physical distances between the AP and the networked devices, and other factors. The conventional centralized network establishment is usually to deploy the AP as close as possible to the center position among the networked devices, so as to obtain the shortest total communication distance from the AP to the all networked devices.

However, the conventional structured and centralized wireless network deployment method has many obvious problems, for example, the deployment locations of the networked devices are greatly limited and difficult to avoid obstacles for communication, and the conventional structured and centralized wireless network deployment method is disadvantageous for distributed configuration of the networked devices, difficult to extend the communication distances of the networked devices, and lacks application of communication relay, and has inflexible network topology routing.

Hence, there is a need to solve the above deficiencies/issues.

SUMMARY

In view of the state of the art, the present invention provides a self-organized network which is decentralized and unstructured and is able to adaptively change a nodal topology thereof and configure a layer of middleware into the network node in response to a current status of practical environment, and dynamically and adaptively determine the nodal topology and issue a self-organization command to the network nodes in accordance with status of the message exchange among the network nodes, so that each network node included in the self-organized network is flexibly switched to be one of a source node, a relay node and a target node in accordance with the self-organization command of the layer of middleware, thereby establishing the self-organized network capable of autonomously changing the network topology thereof to deploy and distribute the network nodes to a wider area. Particularly, the technical solution in the present invention is suitable for flexible establishment of the self-organized network among devices in array, or broadcast of emergent event.

Accordingly, the present invention provides a method for building self-organized network. The method includes steps as follows: providing a plurality of network nodes and configuring a layer of middleware into the each of the plurality of network nodes; implementing a hop-by-hop transport test to acquire a current status of message exchange among the plurality of network nodes; computing a nodal topology for the plurality of network nodes in accordance with the current status; establishing at least one peer-to-peer communication link among the plurality of network nodes in accordance with the nodal topology; and transmitting messages through the at least one peer-to-peer communication link.

The present invention further provides a self-organized network node device, which is one of a plurality of network nodes. The device includes: a processing unit configured to execute a layer of middleware to implement a hop-by-hop transport test to acquire a current status of message exchange among the plurality of network nodes and to compute a nodal topology for the plurality of network nodes in accordance with the current status; and a communication unit configured to establishing at least one peer-to-peer communication link among the plurality of network nodes in accordance with the nodal topology to transmit messages through the at least one peer-to-peer communication link.

The present invention further provides a self-organized network. The network includes: a plurality of network nodes, each of which the plurality of network nodes is configured to execute a layer of middleware to implement a hop-by-hop transport test to acquire a current status of message exchange among the plurality of network nodes and to compute a nodal topology for the plurality of network nodes in accordance with the current status, wherein among the plurality of network nodes, at least one peer-to-peer communication link is established among the plurality of network nodes in accordance with the nodal topology to transmit messages through the at least one peer-to-peer communication link.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
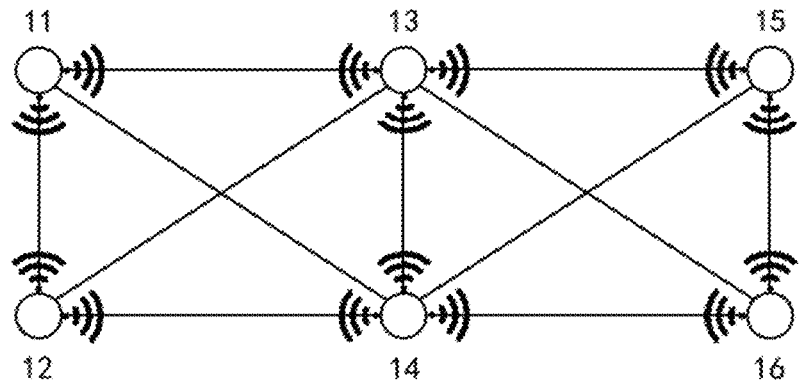
FIG. 1 is a topological diagram illustrating a routing topology formed by the possible routing paths existing among a plurality of network nodes.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

FIG. 1 is a topological diagram illustrating a routing topology formed by the possible routing paths existing among a plurality of network nodes. As shown in FIG. 1, the network nodes 11, 12, 13, 14, 15 and 16 are randomly distributed in an area, and the network nodes 11, 12, 13, 14, 15 and 16 are distributed over an intranet or an external network, the network nodes 11, 12, 13, 14, 15 and 16 are located within a communication range to each other, and a plurality of routing paths exist thereamong to establish communication links. The method of building the self-organized network in the present invention is able to real-time dynamically and autonomously build a peer-to-peer self-organized network among the network nodes 11 and 12, 13, 14, and 15, and 16, in response to the current status of message exchange among the network nodes.

Figure 2A:
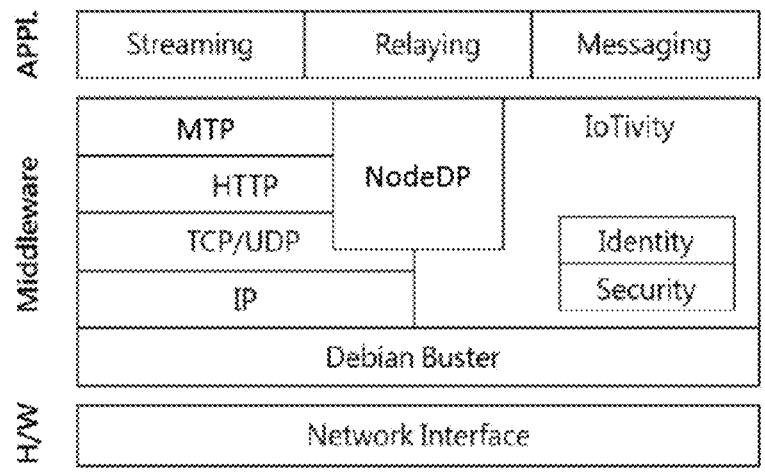
FIG. 2A is an architecture view diagram illustrating a layered stack of functionality for the middleware in accordance with the present invention.

FIG. 2A is an architecture view diagram illustrating a layered stack of functionality for the middleware in accordance with the present invention. In this embodiment, each of the network nodes 11, 12, 13, 14, 15 and 16 are configured with a middle layer of middleware (Middleware) acting as a core architecture for dynamically establishing a self-organized network. Preferably, the layer of middleware belongs to an upper-layer middleware software or a IoT middleware software which is built with various internet protocols and frameworks generally including a node detection protocol (NodeDP), a handshaking enablement protocol (HEP), an internet application-layer message transport protocol (MTP), an internet of things message transport protocol and an IoT framework and so on.

The node detection protocol is preferably, for example but not limited to, a Universal Plug and Play protocol (UPnP), a Simple Service Discovery Protocol (SSDP), a Neighbor Discovery Protocol (NDP) or a Peer Discovery Protocol (PDP). The handshaking enablement protocol is preferably, for example but not limited to, a HyperText Transfer Protocol 1.0 (HTTP/1.0), a HyperText Transfer Protocol 1.1 (HTTP/1.1), a HyperText Transfer Protocol 2.0 (HTTP/2.0), a HyperText Transfer Protocol 1.1 (HTTP/1.1), a HyperText Transfer Protocol 2.0 (HTTP/2.0), a HyperText Transfer Protocol 3.0 (HTTP/3.0), a HyperText Transfer Protocol Secure (HTTPS over TLS, HTTPS over SSL) or a Quick UDP Internet Connections (QUIC). The internet application-layer message transport protocol and internet of things message transport protocol are preferably, for example but not limited to, a Message Queueing Telemetry Transport (MQTT), an Extensible Messaging and Presence Protocol (XMPP), a Constrained Application Protocol (CoAP), an Advanced Message Queuing Protocol (AMQP), a Representational State Transfer (REST) or a WebSocket transport protocol.

For example, in an embodiment in the present invention, the layer of middleware preferably includes a HTTP/3.0 protocol, a QUIC protocol, two internet protocol suite (IPS) internet protocol application layers, a UPnP protocol, a MQTT protocol, IoT message transport protocol which is, for example but not limited to, IoTivity. The layer of middleware is configured to provide upper layers with application functions (APPL) such as streaming media, relay transmission and message transmission, and is downwardly connected to the communication link in the data link layer and to the hardware (H/W) equipment in the physical layer. FIG. 2 shows an architecture view of layers in system function stack of layer of middleware.

The SSDP protocol included in the UPnP protocol is a core protocol of the UPnP protocol and implemented based on the HTTPU protocol. The SSDP protocol is configured to provide a function of discovering the available node in the local area network, and each of the network nodes 11, 12, 13, 14, 15 and 16 become the client peer accepting the SSDP service by enabling the SSDP protocol of the layer of middleware thereof. After a client peer is connected to the network, the client peer transmits the ssdp message to an assigned SSDP port with multicast address, in accordance with the self-status. For example, the SSDP message is selected from a ssdp:discover message, a ssdp:alive message and a ssdp:byebye message, and these messages respectively indicates that a node is connected, a node is available, and a node is disabled. The condition of the disabled node may include, for example but not limited to, failure, poor signal reception or loss of power. The client peer can detect and identify the status of other client peer by continuously monitoring the SSDP port with the multicast address.

The MQTT protocol configured in the layer of middleware is belonged to a lightweight publish-subscribe message protocol in software architecture, and is usually executed on the transmission control protocol(TCP) of the transport layer, the internet protocol (IP) of the network layer, or on the User Datagram Protocol (UDP). The MQTT protocol is configured to perform application layer messaging among the network nodes 11, 12, 13, 14, 15 and 16, perform data exchange by using text format of JavaScript object notation (JSON). The MQTT protocol is configured to manage the communication among synchronous or asynchronous message queues or processes through message broker mechanism. Preferably, the broker peer is a micro controller or a remote server configured to receive all messages from a MQTT publisher, and then transmit the messages to a MQTT subscriber.

The standard version of MQTT is configured to manage messages based on topics, and publish/subscribe messages based on the message broker mechanism. The subscriber can subscribe to the topic of interest, and the publisher and subscriber do not need to know each other's existence. Each of the network nodes 11, 12, 13, 14, 15 and 16 are both of the MQTT publisher and the MQTT subscriber. Each of the network nodes 11, 12, 13, 14, 15 and 16 just needs to subscribe to the required topics. The IoT universal communication framework IoTivity provides simple identity authentication and communication security functions. Preferably, the entire layer of middleware is executed on the Debian operating system (OS), such as the buster version of the Debian OS.

Figure 2B:
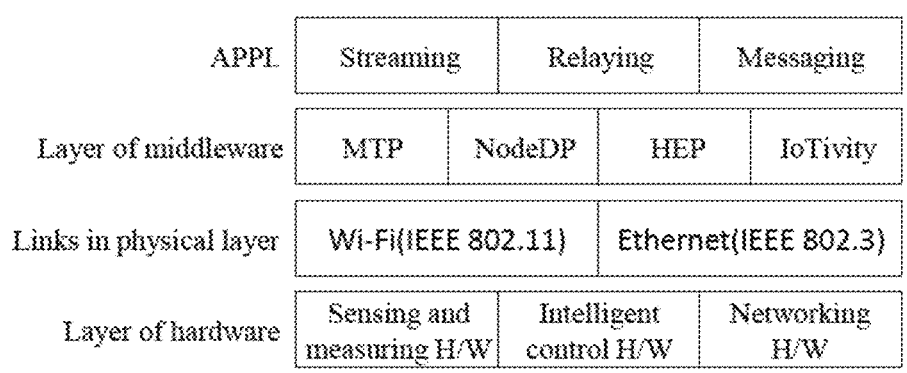
FIG. 2B is an architecture view diagram illustrating a layered hardware functionality for the network nodes according to the present invention.

FIG. 2B is an architecture view diagram illustrating a layered hardware functionality for the network nodes according to the present invention. The layer of middleware configured in the network node is combined with the functional hardware, which is equipped with the network node, through firmware, so as to form a complete network node. The layer of hardware equipment functionally covers sensing and measuring hardware, intelligent control hardware, and networking hardware and so on. The sensing and measuring hardware covers various sensors, data acquisition devices, transducers and surveillance equipment that provide sensing, measuring, surveillance functions. The sensed signals are transmitted via the uplink. The intelligent control hardware covers a variety of devices capable of being controlled by the remote operations from downlink; for example, the intelligent control hardware includes gateway, smart socket, smart bulb, or servos motor. The networking hardware refers to the networking unit used to build a network.

Figure 3:
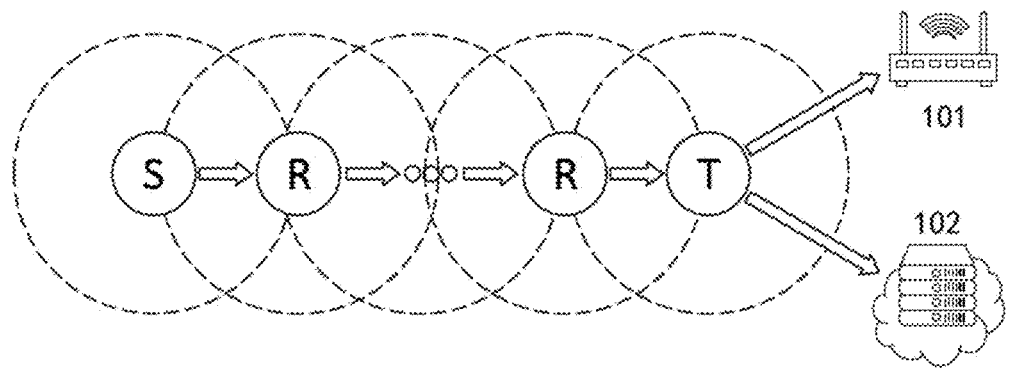
FIG. 3 is a schematic diagram illustrating the architecture of network transmission for the source, relay and target nodes included in the self-organized network in accordance with the present invention.

FIG. 3 is a schematic diagram illustrating the architecture of network transmission for the source, relay and target nodes included in the self-organized network in accordance with the present invention. As shown in FIG. 3, the layer of middleware divides the network nodes into three node types including the source node S, the relay node R, and the target node T. According to the definitions for the three types of network nodes in the present invention, as shown in FIG. 3, the message packet generated by the source node S is eventually transmitted to the target node T, the transmission is routed through at least one relay node R or not through any relay node R; the relay node R is used to forward the message packet between the source node S and the target node T; the target node T is the transmission destination of the message packet in the self-organized network.

After the target node T receives the message packet, the target node T continues to transmit the message packet to, for example but not limited to, the AP device used to access external networks or the Internet; for example, the AP device is preferably a bridge, a gateway or a wireless base station 101. As a result, the message packet is further uploaded to a remote server, a surveillance platform, a care platform, management background or background applications. In a condition that the target node T is an AP device, after the target node T receives the message packet, the target node T continues to transmit the message package to the external device, such as but not limited to, the web server 102 or the background application.

The source node S, the relay node R and the target node T preferably include various sensors or IoT sensors, such as but not limited to: heart rate sensor, blood oxygen sensor, blood pressure meter, forehead thermometer, heart rate meter, accelerometer, gyroscope, motion sensor, temperature sensor, humidity sensor, air quality sensor, rangefinder, depth camera, odometer, action sensor, tachometer, displacement sensor, optical encoder, video camera, surveillance camera, infrared thermal imager, streaming media devices, or other terminal networking equipment which is able to actively generate the message packet including data, information, messages and so on.

The source node S, the relay node R and the target node T preferably include various sensing units, such as but not limited to: image sensor, piezoelectric crystal chemical sensor, surface acoustic wave sensor, optical chemical sensor, electrochemical sensor, semiconductor chemical sensor, surface plasmon resonance chemical sensor, biological sensor, thermochemical sensor, magnetochemical sensor, field chemical sensor, toxic gas field chemical sensor, chemical sensor, micro-electromechanical sensor, nano-crystal chemical sensor, electromagnetic wave sensor, mechanical wave sensor, thermal sensor or force sensor.

The source node S, the relay node R and the target node T preferably include various data acquisition sensors, such as but not limited to: temperature sensor, humidity sensor, fine particulate matter sensor, coarse particulate matter sensor, sulfur dioxide sensor, carbon dioxide sensor, ozone sensor, carbon monoxide sensor, air pressure sensor, illuminance sensor, noise sensor, volatile organic compound sensor or nitrogen dioxide sensor. In a preferred embodiment, the source node S, the relay node R and the target node T include surveillance equipment, such as but not limited to, motion sensor, smoke detector, water leak detector, monitor or door sensor.

The source node S, the relay node R and the target node T preferably include various remotely operated equipment, such as but not limited to: gateway, smart socket, smart alarm, smart light bulb, smart lamp, servo motor or smart lock. In a preferred embodiment, the source node S, the relay node R and the target node T include networking devices, such as but not limited to: gateway, router, network switch, bridge, repeater, hub, wireless network access point or address sharing device.

Figure 4:
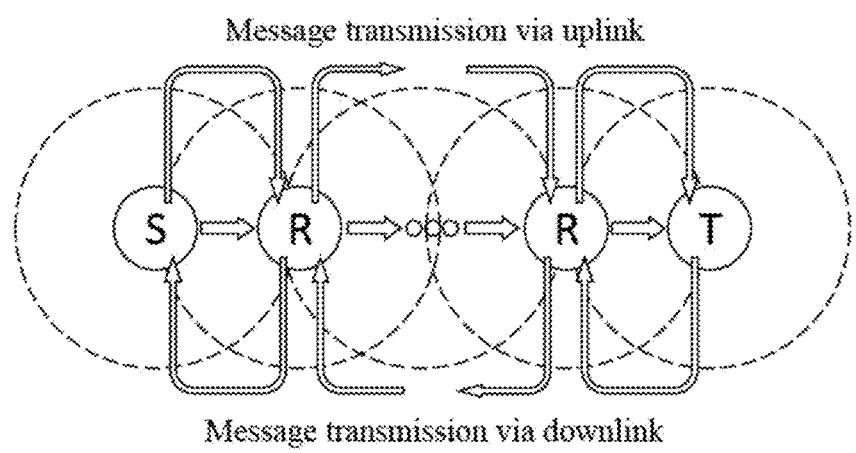
FIG. 4 is a schematic diagram illustrating the architecture of network for the use of internet application-layer message transport protocol in the present invention to realize message transmission among various types of network nodes, according to the present invention.

FIG. 4 is a schematic diagram illustrating the architecture of network for the use of internet application-layer message transport protocol in the present invention to realize message transmission among various types of network nodes, according to the present invention. In this embodiment, after the types of the network nodes 11, 12, 13, 14, 15 and 16 are assigned by the layer of middleware, the source node S, the relay node R and the target node T commence to enable, for example but not limited to, MQTT protocol to become the MQTT client peers, and the relay node R and the target node T subscribe to the specific topic through the MQTT protocol. Once the source node S commences to generate the message packet, the source node S publishes the message packet immediately through the MQTT protocol. The relay node R receives the message packet, which is published from the source node S, based on the MQTT subscription mechanism, and continues to publish the message packet through the MQTT protocol. The target node T receives the message packet, published from the source node S, based on the MQTT subscription mechanism, so that the transmission of the message packet from the source node S to the target node T is completed.

Figure 5:
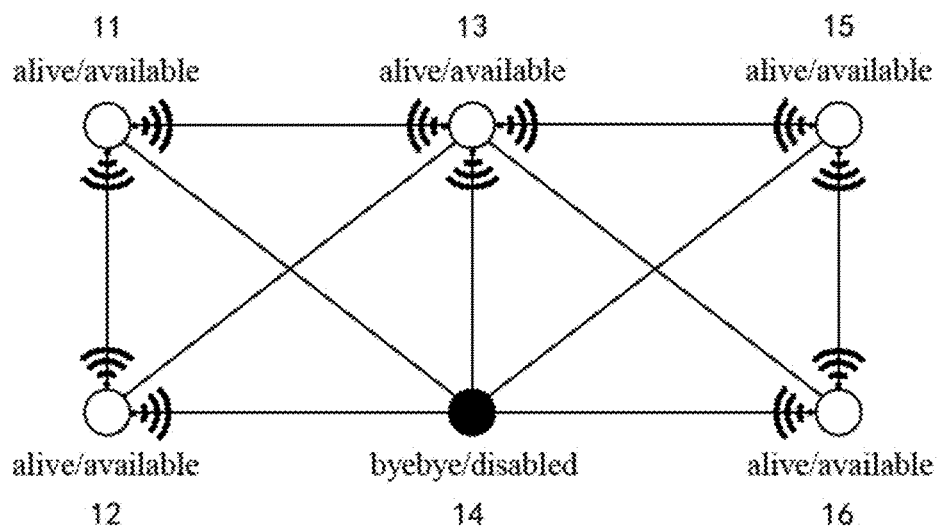
FIG. 5 is a schematic diagram illustrating the architecture of network for the use of the node detection protocol in the architecture of network, according to the present invention.

FIG. 5 is a schematic diagram illustrating the architecture of network for the use of the node detection protocol in the architecture of network, according to the present invention. In order to build an available self-organized network, it must first make sure that all the nodes used to build the self-organized network are available network nodes, and the disabled or malfunctioning network node is precluded in advance. In this embodiment, as shown in FIG. 5, the layer of middleware in each of the network nodes 11, 12, 13, 14, 15 and 16 enables, for example but not limited to, the SSDP protocol, and periodically sends the ssdp message to the SSDP port with the multicast address, so as to indicate its status to other network node. In this embodiment, the network nodes 11, 12, 13, 15 and 16 are normally functioning (available) devices and transmit the ssdp:live messages to the SSDP port, the network node 14 is the malfunctioning (disabled) device and transmits the ssdp:byebye message to the SSDP port. Therefore, the layer of middleware can discover the available network nodes 11, 12, 13, 15 and 16 and the disabled network node 14 during the process of building the self-organized network.

Figure 6:
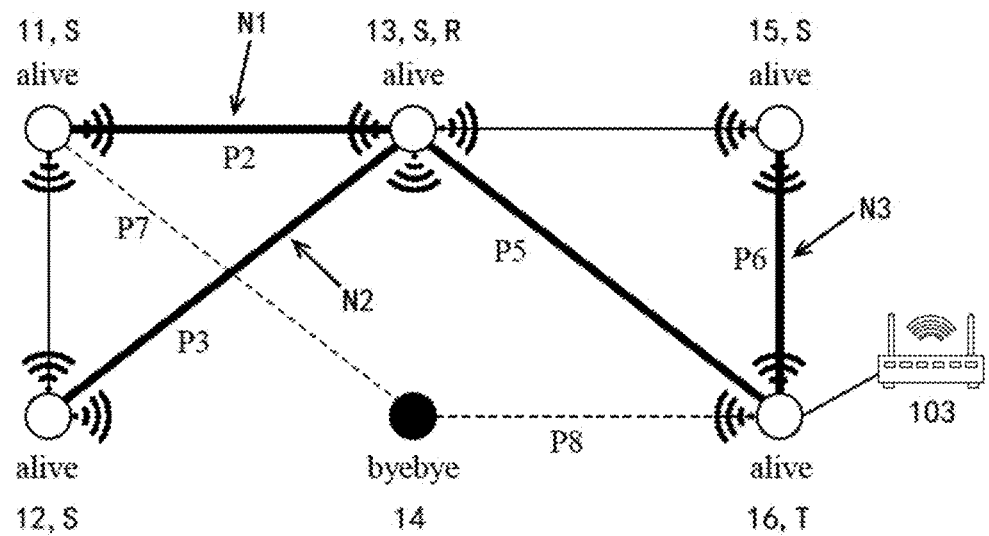
FIG. 6 is a schematic diagram illustrating the architecture of network for the self-organized network in accordance with the present invention.

FIG. 6 is a schematic diagram illustrating the architecture of network for the self-organized network in accordance with the present invention. For convenience in explanation, the network nodes 11, 12, 13, 14, 15 and 16 in this embodiment are streaming cameras, each of the network nodes 11, 12, 13, 14, 15 and 16 is at least configured with a layer of middleware, two independent Wi-Fi modules, a HTTP protocol module and a TCP/IP standard protocol module.

The network node 11 is taken as an example for illustration. After the network node 11 is activated, the layer of middleware assigns the network node 11 as the source node S and enables, for example but not limited to, the SSDP protocol. By monitoring the SSDP port with multicast address, the layer of middleware discovers that the network nodes 11, 12, 13, 15 and 16 are available nodes and the network node 14 is an unavailable node. Then, the layer of middleware implements hop-by-hop transmission technology based on the in-layer protocol in the layer lower than the data link layer, so as to transmit a test packet from a source node, and the test packet is stored and forwarded node by node until the test packet reaches the target node. Therefore, during the transmission of the test packet from the starting node to the target node, the test packet routes a part or all of the relay nodes even if no permanent communication link has been established among these nodes.

The implementation of the hop-by-hop transport test is capable of acquiring, for example but not limited to, the raw information by operation of: drawing the data flow view among the network nodes, scanning and recording the MAC identifier of the node, scanning and recording the Wi-Fi Service Set Identifier (SSID) of the nodes, scanning communication hardware configuration of the nodes, acquiring media type metadata supported by the nodes, accessing the neighboring device list, acquiring the device role, and acquiring distance between the nodes and the wireless AP. In accordance with the raw information, the layer of middleware further calculates the packet loss rate and Round Trip Time (RTT), latency, the shortest communication route, the route having shortest transmission time, the route having the best signal quality, and the route having the fewest relay node, so that the layer of middleware can understand the current status of message exchange among the nodes.

Next, the target node T is selected. The manner of selecting the target node T includes, for example but not limited to: selecting the target node T according to the MAC identifier or the Wi-Fi SSID, pre-assigning the target node T in the layer of middleware, or determining the target node T according to the current status of message exchange acquired by the hop-by-hop transport test. In this embodiment, because the network node 16 is closest to the wireless access point 103, the network node 16 is assigned as the target node T.

Subsequently, the relay node is selected based on the current status of message exchange acquired by the hop-by-hop transport test. In this embodiment, the layer of middleware selects the network node 13 as the relay node R in accordance with the QoS results among the node, and then enables, for example but not limited to, the HTTP/3.0 protocol to use QUIC protocol to implement a handshaking process between among the network nodes 11, 13 and 16, to exchange the MAC identifier, the TCP/IP data or the UDP data of nodes, so as to establish the P2P communication links among the network nodes 11, 13 and 16 to build the self-organized network N1, wherein the P2P communication links include the P2P communication link P2 from the network node 11 to the network node 13, the P2P communication link P5 from the network node 13 to the network node 16, as shown in FIG. 6.

Then the layer of middleware enables, for example but not limited to, the MQTT protocol on each of the network node 11, the network node 13 and the network node 16, and subscribes to messages with the topic of multimedia streaming. The network node 11 publishes the captured multimedia streaming messages; the network node 13 receives the subscribed multimedia streaming message and publishes the subscribed multimedia streaming message again; the network node 16 receives the subscribed multimedia streaming message and transmits the subscribed multimedia streaming message to the wireless access point 103, so as to upload the subscribed multimedia streaming message to the remote monitoring platform on the background server. The remote monitoring platform then informs the relevant personnel or executes relevant preset instructions in accordance with the setting.

By the same token, after the network node 12 begins image streaming, the network node 12 and the network node 13 are selected to establish the P2P communication link P3 therebetween, and the network node 13 and the network node 16 are selected to establish the P2P communication link P5 therebetween in accordance with the current status of message exchange acquired by the hop-by-hop transport test, so as to build the self-organized network N2. After the network node 15 begins image streaming, the network node 15 and the network node 16 are selected to establish the P2P communication link P6 directly therebetween in accordance with the current status of message exchange acquired by the hop-by-hop transport test, so as to build the self-organized network N3.

During the operations of the self-organized networks N1, N2 and N3, the originally-available network node may fail at any time because of malfunctioning, poor signal reception or loss of power, and the originally-failed network node may be reconnected to the network and restored as the available node due to the removal of the failure reason. Therefore, the layer of middleware can continuously execute the node detection protocol on the background of the operating system or periodically enable the node detection protocol to detect whether the status of any network node is changed from the disabled status to the available status, from the available status to the disabled status, and re-implement hop-by-hop transport test to recalculate and create a new nodal topology in response to the change in statuses of the network nodes.

For example, when the status of the network node 14 is restored to the available status from the disabled status and the status of the network node 13 is changed to the disabled status from the available status, the network node 11 can re-establish the transmission route, for example, the network node 11 can determine to establish the P2P communication link P7 between the network node 11 and the network node 14 and the P2P communication link P8 between the network node 14 and the network node 16 in accordance with the re-calculated result, so as to dynamically re-establish the self-organized network N1 to ensure that the important messages sent from the network node 11, and uninterruptedly uploaded to the remote monitoring platform on the background server through the wireless access point 103.

In order to optimize the performance of establishing the P2P communication link, the embodiment in the present invention preferably utilizes, for example but not limited to, the QUIC connection establishment mechanism included in the HTTP/3.0 protocol, the establishment of the initial interconnection consumes 1 unit of RTT only, and it has an advantage of ultra-low latency to greatly reduce the communication latency created by P2P communication link, compared with the HTTP/2.0. The above embodiment is an example for explanation, and the present invention is not limited to the example.

The network self-organization method proposed in the present invention is to deploy the layer of middleware in each of the network nodes, to facilitate to calculate and adapt the topology of the network in accordance with the statuses of the nodes and the current status of message exchange among the nodes at any time, so that the important message generated by the source node S can be continuously and uninterruptedly transmitted to the target node T or the remote management background.

The present invention proposes a media message distribution mechanism on unstructured wireless P2P network. In any existing communication infrastructure, multiple cameras having Wi-Fi and IoT functions are able to self-organize the P2P network thereof, and each camera publishes, subscribes and relays media messages in a P2P mode, so that any two devices in the network is able to send timely messages on the relay route, and the relay device forwards the media stream.

Figure 7:
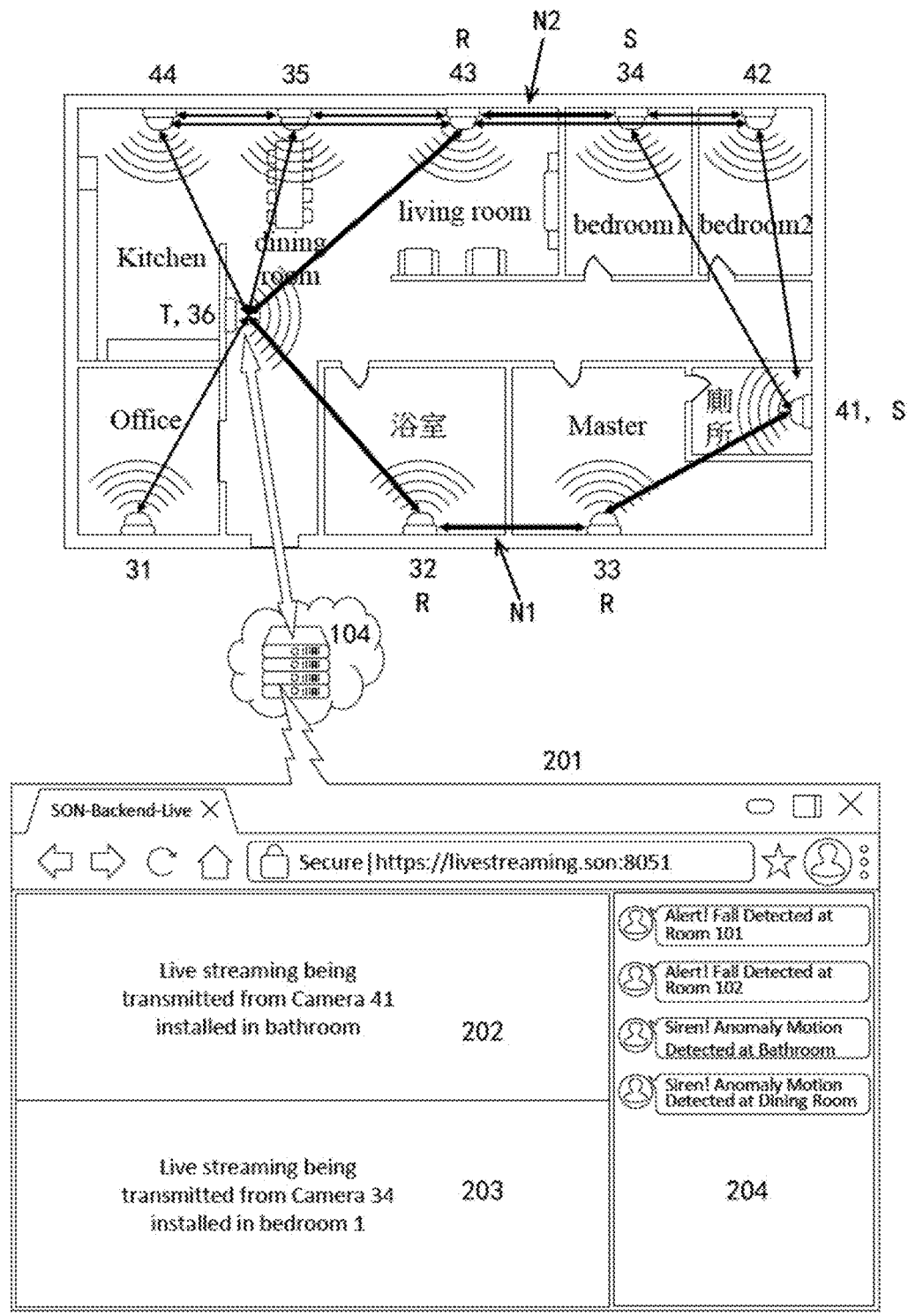
FIG. 7 is a schematic diagram illustrating an application of a first embodiment for the self-organized network in accordance with the present invention.

FIG. 7 is a schematic diagram illustrating an application of a first embodiment for the self-organized network in accordance with the present invention. In this embodiment, a residential surveillance situation is taken as an example to illustrate the application scenario of the self-organized network in the present invention. FIG. 7 shows a basic residential floor plan view including a living room, a kitchen, several bedrooms, offices, and toilets. Each room is deployed with one or two of the steaming cameras 31-36 and 41-44, each of the streaming cameras 31-40 is configured with a layer of middleware inside. Each of the streaming cameras 41-44 has a longer communication distance, and each of the streaming cameras 31-36 has a shorter communication distance. Each of the streaming cameras 31-36 and 41-44 can serve as a server peer, a client peer and a gateway peer in the P2P network.

In this embodiment, each of the streaming camera 31-36 and 41-44 serving as network nodes has Image processing and computing capability and is configured with high-performance image processor module, and is able to autonomously detect and determine whether a specific trigger event occurs, so as to achieve edge computing. For example, each of the streaming cameras 31-36 and 41-44 is able to detect a motion event occurring indoors by executing a frame comparison calculation. For example, when the streaming camera 41 set in the toilet detects that an unexplained motion event occurs in the toilet, the layer of middleware configured in the streaming camera 41 enables the image streaming function and starts to build the self-organized network N1. After enabling the node detection protocol to confirm the available node, the layer of middleware configured in the streaming camera 41 implements the hop-by-hop transport test and discovers that only the streaming camera 36 has external communication capability, so the streaming camera 36 is assigned as the target node T.

The streaming camera 41 further assigns the streaming cameras 33 and 32 as the relay nodes R based on the shortest transmission time requirement, and establishes the P2P-based self-organized network N1, and then the internet application-layer message transport protocols in the streaming cameras 41,32,33 and 36 are enabled to transmit the real-time video stream to the streaming camera 36, and then the streaming camera 36 transmits the real-time video stream to the monitoring platform on the remote server 104, and the monitoring platform continues to transmit the real-time video stream to the safety monitoring platform web 201 of the security center, and the first display area 202 of the safety monitoring platform web 201 displays the real-time video stream from the streaming camera 41. After watching video displayed on the first display area 202, personnel in the security center learns that the unexplained action event occurred in the toilet is caused by a towel slipping off. Preferably, the safety monitoring platform web 201 is embedded with an instant messaging interface 204.

When the streaming camera 34 is required to monitor for 24 hours, the streaming camera 34 assigns the streaming camera 36 as the source node S and assigns the streaming camera 43 as the relay node R in accordance with the calculation result of the layer of middleware, so as to establish the P2P-based self-organized network N2. Next, the message transport protocols in the streaming cameras 34, 43 and 36 are enabled to transmit the real-time streaming image to the safety monitoring platform web 201, the second display area 203 of the safety monitoring platform web 201 displays the real-time video stream from the streaming camera 34 to uninterruptedly provide personnel in the security center for 24-hour monitoring. The layer of middleware can periodically monitor the specified addressing port, and if necessary, layer of middleware recalculates the nodal topology, so as to facilitate to reorganize the self-organized networks N1 and N2 at any time.

Figure 8:
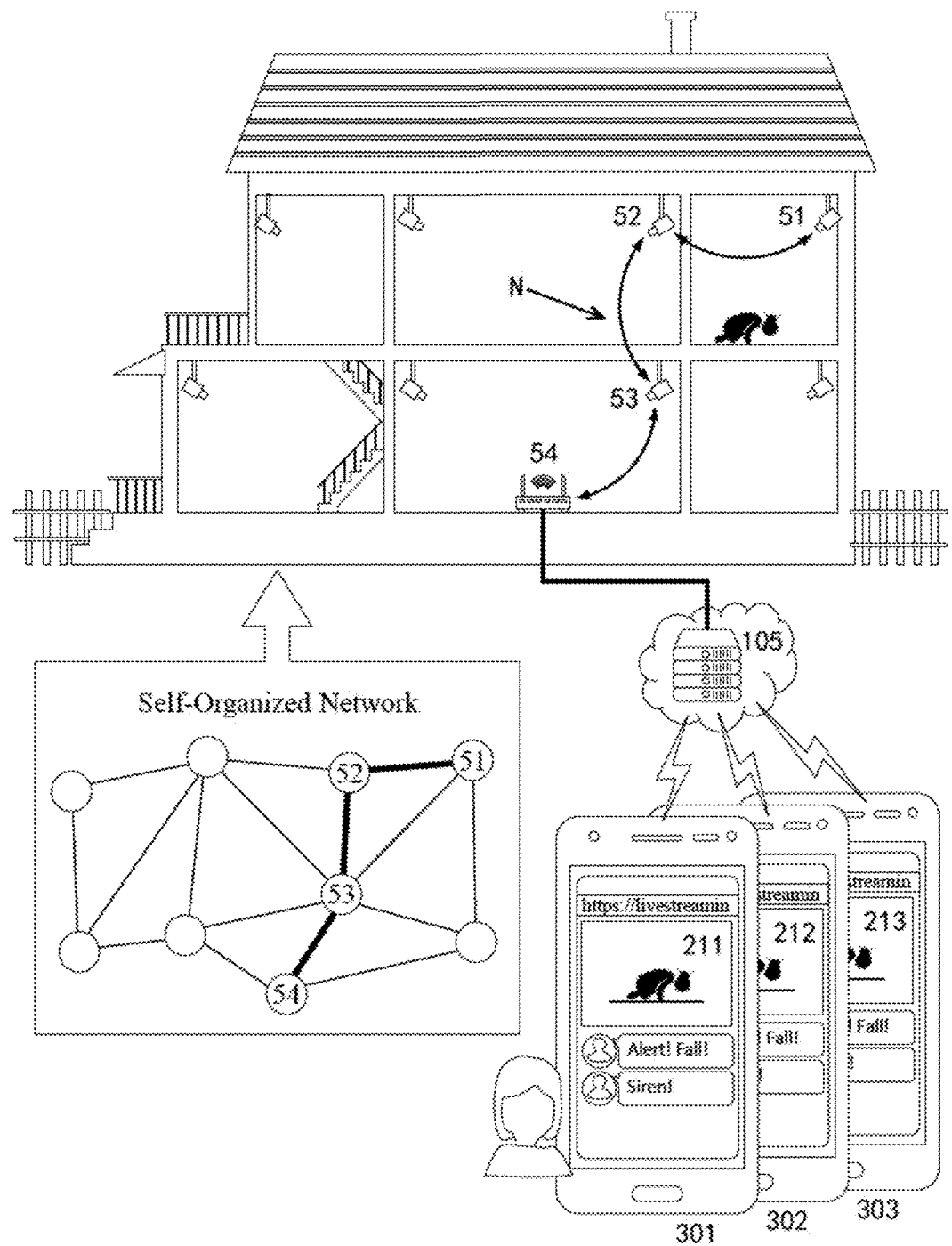
FIG. 8 is a schematic diagram illustrating an application of a second embodiment for the self-organized network in accordance with the present invention.

FIG. 8 is a schematic diagram illustrating an application of a second embodiment for the self-organized network in accordance with the present invention. In this embodiment, a home care scenario is taken as an example to illustrate the application scenario of the self-organized network in the present invention. As shown in FIG. 8, each of rooms in a house is deployed with one or two streaming camera, and each streaming camera has image processing and calculation functions and is able to automatically detect and determine occurrence of an elder's fall event. When the streaming camera 51 detects occurrence of the elderly's fall event and triggers image streaming, the streaming camera 51 discovers the network node 54, which is wireless AP equipment, by identifying the MAC identifier, so the streaming camera 51 assigns the network node 54 as the target node T and assigns the streaming cameras 52 and 53 as the relay nodes R, so as to establish the self-organized network N to transmit the real-time streaming image to the care platform in the back-end server 105. The care platform broadcasts the real-time streaming image to the video pages 211, 212 and 213 of the front-end applications in multiple user equipments (UEs) 301, 302 and 303, or broadcasts text message to instant messaging software (such as Line APP) in the UEs 301, 302 and 303, so as to provide related personnel (such as family members, caregivers or emergency personnel) for viewing and reading. The present invention is especially suitable for broadcasting emergency events.

Therefore, according to technical solution in the present invention, each network node uses the current status of message exchange among the network nodes to calculate the nodal topology, and proposes a media message distribution mechanism on the unstructured wireless P2P network, so that in any existing communication infrastructure, the multiple cameras having Wi-Fi and IoT functions are able to self-organize the internal P2P network thereof, and each camera publishes, subscribes and relays media messages in the P2P mode. Therefore, any two devices in the network is able to send timely messages on the relay route, and the relay device forwards the media stream.

In particular, for many indoor networks, data transmission is affected to cause insufficient network stability by many factors such as network deployment and transmission distance, therefore, it is necessary to perform the self-organization among the node devices to build the dedicated network upon requirement.

The present invention proposes the self-organized network architecture among neighboring IoT devices. After establishing the point-to-point connection, the IoT devices can directly share information without through a central server and without being affected by divisional wireless network deployments in environment. The present invention also has the following advantages:

(1) For the aspect of the self-organized network architecture: based on the self-organized network architecture in the present invention, the neighboring devices are able to directly establish the point-to-point connection and relay data stream transmission without relying on the basic network architecture.

(2) For the aspect of the camera deployment: the device in the environment is able to obtain a complete network topology and discover a relay route, passing through another device, for the data flow between the source device and the target device.

(3) For the aspect of hop-by-hop media streaming: in order to overcome the divisional deployments of wireless network in the environment, the new wireless data technology in the present invention enables the devices to directly share information to publish, subscribe to and relay the media messages without relying on a central server.

(4) For the aspect of home network structure: the technical solution in the present invention provides a self-organized, dynamically-connected, distributed and unstructured home network structure which supports the deployment of camera arrays and discovery of devices and services in the home environment.

(5) There is no need to modify the existing network infrastructure: the technical solution in the present invention can be directly implemented on the existing network architecture and is compatible with the existing network layered stack architecture without any of modification, and the layer of middleware can be installed in the network node without modifying the existing network architecture.

Figure 9:
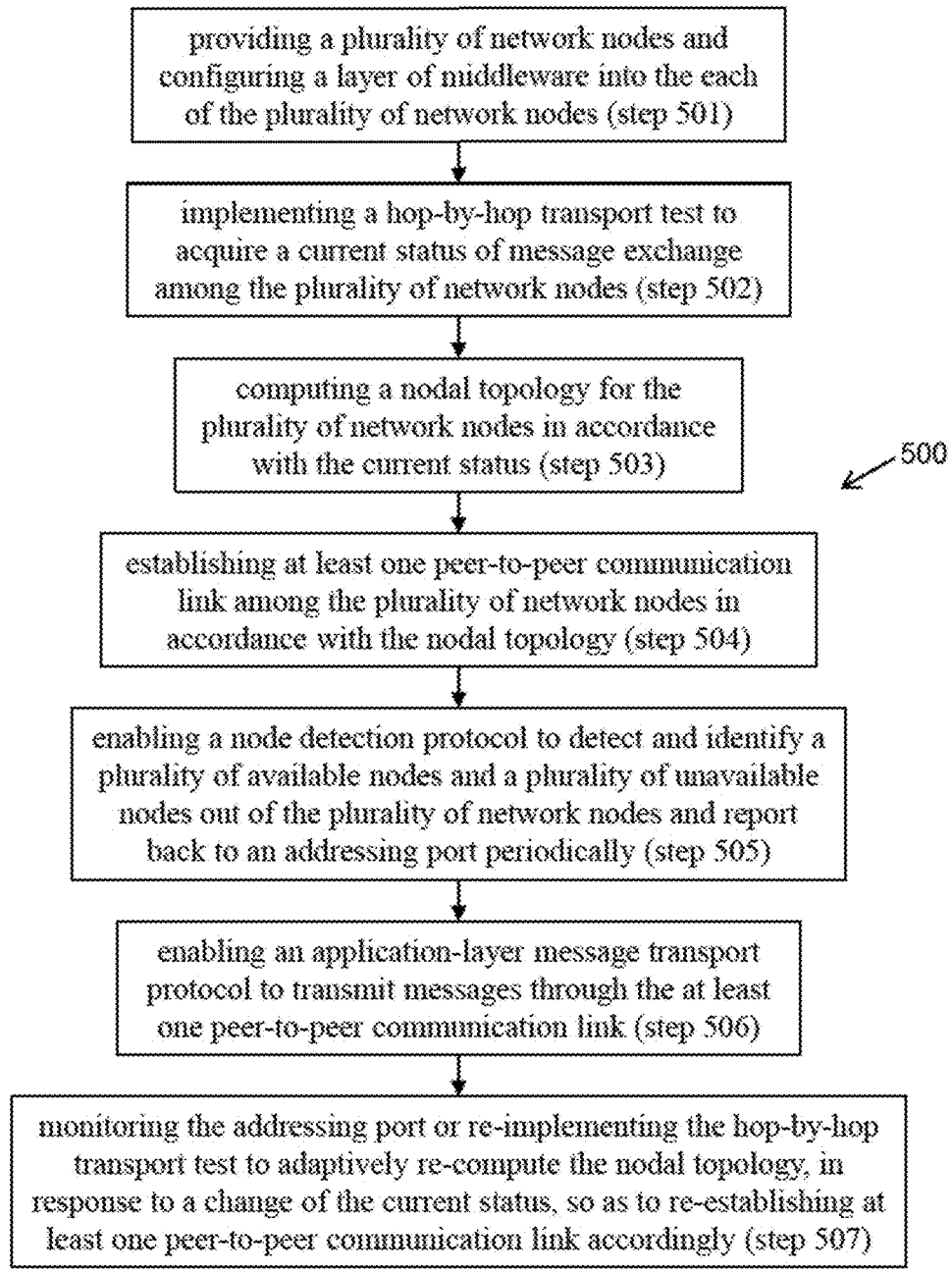
FIG. 9 is a flow chart illustrating the method building self-organized network in accordance with the present invention.

FIG. 9 is a flow chart illustrating the method building self-organized network in accordance with the present invention. To sum up, the method for building self-organized network 500 in accordance with the present invention preferably includes the following steps: providing a plurality of network nodes and configuring a layer of middleware into the each of the plurality of network nodes (step 501); implementing a hop-by-hop transport test to acquire a current status of message exchange among the plurality of network nodes (step 502); computing a nodal topology for the plurality of network nodes in accordance with the current status (step 503); establishing at least one peer-to-peer communication link among the plurality of network nodes in accordance with the nodal topology (step 504); enabling a node detection protocol to detect and identify a plurality of available nodes and a plurality of unavailable nodes out of the plurality of network nodes and report back to an addressing port periodically (step 505); enabling an application-layer message transport protocol to transmit messages through the at least one peer-to-peer communication link (step 506); and monitoring the addressing port or re-implementing the hop-by-hop transport test to adaptively re-compute the nodal topology, in response to a change of the current status, so as to re-establishing at least one peer-to-peer communication link accordingly (step 507).

There are further embodiments provided as follows.

Embodiment 1: A method for building self-organized network, including: providing a plurality of network nodes and configuring a layer of middleware into the each of the plurality of network nodes; implementing a hop-by-hop transport test to acquire a current status of message exchange among the plurality of network nodes; computing a nodal topology for the plurality of network nodes in accordance with the current status; establishing at least one peer-to-peer communication link among the plurality of network nodes in accordance with the nodal topology; and transmitting messages through the at least one peer-to-peer communication link.

Embodiment 2: The method for building self-organized network as described in Embodiment 1, further includes one of steps as follow: enabling a node detection protocol to detect and identify a plurality of available nodes and a plurality of unavailable nodes out of the plurality of network nodes and report back to an addressing port periodically; enabling a handshaking enablement protocol to perform a handshaking process among the plurality of available nodes in reference with the nodal topology to establish the at least one peer-to-peer communication link; enabling an application-layer message transport protocol to transmit messages through the at least one peer-to-peer communication link; enabling an internet of things message transport protocol to transmit messages through the at least one peer-to-peer communication link; enabling an internet of things (IoT) framework to assign an identity and to assure a security of communication for the plurality of network nodes; enabling the IoT framework to render the plurality of network nodes to have a IoT data communication framework to realize a seamless node-to-node connectivity, an access of IoT network, and an establishment of IoT; assigning a node type to each of the plurality of network nodes; monitoring the addressing port or re-implementing the hop-by-hop transport test to adaptively re-compute the nodal topology, in response to a change of the current status, so as to re-establishing at least one peer-to-peer communication link accordingly; and configuring one of a sensing and measuring hardware module, an intelligent control hardware module, a networking hardware module and a combination thereof into each of the plurality of network nodes.

Embodiment 3: The method for building self-organized network as described in Embodiment 1, the node detection protocol is selected from one of a Universal Plug and Play (UPnP) protocol, a Simple Service Discovery Protocol (SSDP), a Neighbor Discovery Protocol (NDP), and a peer discovery protocol (PDP).

Embodiment 4: The method for building self-organized network as described in claim 1, the handshaking enablement protocol is selected from one of a HyperText Transfer Protocol 1.0 (HTTP/1.0), a HyperText Transfer Protocol 1.1 (HTTP/1.1), a HyperText Transfer Protocol 2.0 (HTTP/2.0), a HyperText Transfer Protocol 3.0 (HTTP/3.0), a HyperText Transfer Protocol Secure (HTTPS over TLS, HTTPS over SSL), and a Quick UDP Internet Connections (QUIC).

Embodiment 5: The method for building self-organized network as described in Embodiment 1, the application-layer message transport protocol and the internet of things message transport protocol are selected from one of a Message Queueing Telemetry Transport (MQTT), an Extensible Messaging and Presence Protocol (XMPP), a Constrained Application Protocol (CoAP), an Advanced Message Queuing Protocol (AMQP), a Representational State Transfer (REST), and a WebSocket transport protocol.

Embodiment 6: The method for building self-organized network as described in Embodiment 1, the node type is selected from a source node, a relay node, and a target node.

Embodiment 7: A self-organized network node device, which is one of a plurality of network nodes, includes: a processing unit configured to execute a layer of middleware to implement a hop-by-hop transport test to acquire a current status of message exchange among the plurality of network nodes and to compute a nodal topology for the plurality of network nodes in accordance with the current status; and a communication unit configured to establishing at least one peer-to-peer communication link among the plurality of network nodes in accordance with the nodal topology to transmit messages through the at least one peer-to-peer communication link.

Embodiment 8: The self-organized network node device as described in Embodiment 7, the processing unit and the communication unit are configured to further perform one of steps as follow: enabling a node detection protocol to detect and identify a plurality of available nodes and a plurality of unavailable nodes out of the plurality of network nodes and report back to an addressing port periodically; enabling a handshaking enablement protocol to perform a handshaking process among the plurality of available nodes in reference with the nodal topology to establish the at least one peer-to-peer communication link; enabling an application-layer message transport protocol to transmit messages through the at least one peer-to-peer communication link; enabling an internet of things message transport protocol to transmit messages through the at least one peer-to-peer communication link; enabling an internet of things (IoT) framework to assign an identity and to assure a security of communication for the plurality of network nodes; enabling the IoT framework to render the plurality of network nodes to have a IoT data communication framework to realize a seamless node-to-node connectivity, an access of IoT network, and an establishment of IoT; assigning a node type to each of the plurality of network nodes; monitoring the addressing port or re-implementing the hop-by-hop transport test to adaptively re-compute the nodal topology, in response to a change of the current status, so as to re-establishing at least one peer-to-peer communication link accordingly; and configuring one of a sensing and measuring hardware module, an intelligent control hardware module, a networking hardware module and a combination thereof into each of the plurality of network nodes.

Embodiment 9: The self-organized network node device as described in Embodiment 7, further includes one of a sensing and measuring hardware module, an intelligent control hardware module, a networking hardware module, and a combination thereof.

Embodiment 10: A self-organized network, includes: a plurality of network nodes, each of which the plurality of network nodes is configured to execute a layer of middleware to implement a hop-by-hop transport test to acquire a current status of message exchange among the plurality of network nodes and to compute a nodal topology for the plurality of network nodes in accordance with the current status, wherein among the plurality of network nodes, at least one peer-to-peer communication link is established among the plurality of network nodes in accordance with the nodal topology to transmit messages through the at least one peer-to-peer communication link.

Embodiment 11: The self-organized network as described in Embodiment 10, each of the plurality of network nodes is configured to further perform one of steps as follow: enabling a node detection protocol to detect and identify a plurality of available nodes and a plurality of unavailable nodes out of the plurality of network nodes and report back to an addressing port periodically; enabling a handshaking enablement protocol to perform a handshaking process among the plurality of available nodes in reference with the nodal topology to establish the at least one peer-to-peer communication link; enabling an application-layer message transport protocol to transmit messages through the at least one peer-to-peer communication link; enabling an internet of things message transport protocol to transmit messages through the at least one peer-to-peer communication link; enabling an internet of things (IoT) framework to assign an identity and to assure a security of communication for the plurality of network nodes; enabling the IoT framework to render the plurality of network nodes to have a IoT data communication framework to realize a seamless node-to-node connectivity, an access of IoT network, and an establishment of IoT; assigning a node type to each of the plurality of network nodes; monitoring the addressing port or re-implementing the hop-by-hop transport test to adaptively re-compute the nodal topology, in response to a change of the current status, so as to re-establishing at least one peer-to-peer communication link accordingly; and configuring one of a sensing and measuring hardware module, an intelligent control hardware module, a networking hardware module and a combination thereof into each of the plurality of network nodes.

Embodiment 12: The self-organized network as described in Embodiment 10, each of the plurality of network nodes further includes one of a sensing and measuring hardware module, an intelligent control hardware module, a networking hardware module, and a combination thereof.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A method for building self-organized network, comprising:

providing a plurality of network devices and configuring a layer of middleware into the each of the plurality of network devices, in which the layer of middleware links an application layer in the top layer of network layered architecture with a physical hardware layer in the bottom layer of network layered architecture and includes an application layer topic based publish-subscribe message transmission protocol, an application layer service discovery protocol, and an application layer simplified datagram handshaking protocol;

selecting a plurality of networked devices out of the plurality of the network devices by activating the layer of middleware configured in the plurality of networked devices by a user by operating through an internet web browser;

subscribing to a topic of interest listed in the application layer topic based publish-subscribe message transmission protocol for the each of the plurality of networked devices by the user by operating through the internet web browser;

implementing the application layer service discovery protocol to acquire a plurality of servicing devices that are available out of the plurality of networked devices, while a trigger event is detected by one of the plurality of networked devices;

establishing an application layer peer-to-peer transmission connection among the plurality of servicing devices by implementing the application layer simplified datagram handshaking protocol; and transmitting a message with a first topic through the application layer peer-to-peer transmission connection by the plurality of servicing devices subscribing to the topic of interest the same with the first topic, whereby a self-organized network is accordingly built up.

2. The method for building self-organized network as claimed in claim 1, further comprising one of steps as follow:

enabling the application layer service discovery protocol to detect and identify a plurality of available devices as the plurality of servicing devices out of the plurality of networked devices and report back to an addressing port periodically;

enabling an internet of things (IoT) framework to assign an identity and to assure a security of communication for the plurality of network devices;

enabling the IoT framework to render the plurality of network devices to have a IoT data communication framework to realize a seamless node-to-node connectivity, an access of IoT network, and an establishment of IoT;

assigning a node type to each of the plurality of servicing devices;

monitoring the addressing port or re-implementing the application layer service discovery protocol so as to re-establishing the application layer peer-to-peer transmission connection accordingly; and configuring one of a sensing and measuring hardware module, an intelligent control hardware module, a networking hardware module and a combination thereof into each of the plurality of network devices.

3. The method for building self-organized network as claimed in claim 2, wherein the node type is selected from a source node, a relay node, and a target node.

4. The method for building self-organized network as claimed in claim 1, wherein the application layer service discovery protocol is selected from one of a Universal Plug and Play (UPnP) protocol, a Simple Service Discovery Protocol (SSDP), a Neighbor Discovery Protocol (NDP), and a peer discovery protocol (PDP).

5. The method for building self-organized network as claimed in claim 1, wherein the application layer simplified datagram handshaking protocol is selected from one of a HyperText Transfer Protocol 1.0 (HTTP/1.0), a HyperText Transfer Protocol 1.1 (HTTP/1.1), a HyperText Transfer Protocol 2.0 (HTTP/2.0), a HyperText Transfer Protocol 3.0 (HTTP/3.0), a HyperText Transfer Protocol Secure (HTTPS over TLS, HTTPS over SSL), and a Quick UDP Internet Connections (QUIC).

6. The method for building self-organized network as claimed in claim 1, wherein the application layer topic based publish-subscribe message transmission protocol is selected from one of a Message Queueing Telemetry Transport (MQTT), an Extensible Messaging and Presence Protocol (XMPP), a Constrained Application Protocol (CoAP), an Advanced Message Queuing Protocol (AMQP), a Representational State Transfer (REST), and a WebSocket transport protocol.

* * * * *